Patented Mar. 21, 1939

2,151,329

UNITED STATES PATENT OFFICE 2,151,329

CATALYST FOR THE PREPARATION OF METHANE FROM CARBON MONOXIDE AND HYDROGEN

Ronald Page and Edward Boaden Thomas, Spondon, near Derby, England, assignors to Celanese Corporation of America, a corporation of Delaware No Drawing. Application October 20, 1936, Serial No. 106,612. In Great Britain October 29, 1935

4 Claims. (Cl. 23—237)

This invention relates to the manufacture of organic gases, and in particular to the manufacture of methane by reaction between carbon monoxide and hydrogen.

According to the invention methane is produced by subjecting a mixture comprising carbon monoxide and hydrogen to elevated temperatures in the presence of a "formed" or shaped catalyst mass comprising metallic nickel and alumina.

The nickel-alumina catalyst may be prepared by adding a solution of nickel nitrate and aluminium nitrate in the desired proportions to a solution of sodium carbonate in order to precipitate together nickel and aluminium oxides, separating and washing the precipitated oxides from the sodium nitrate solution so formed, and reducing the nickel oxide in the mixture to metallic nickel, for example by heating the mixture of oxides in a current of a reducing gas such as carbon monoxide or hydrogen, or a mixture comprising these gases. For instance the reaction gas mixture itself may be employed to reduce the nickel oxide; thus the reduction may take place during the first stages of the synthesis.

The "formed" or shaped catalyst mass is preferably prepared at low temperatures. Thus the oxides of nickel and aluminium may be precipitated together from a solution of the corresponding nitrates, freed from the sodium nitrate solution remaining as far as possible by pressing, draining, centrifuging or the like at ordinary temperatures, i. e. at temperatures of the order of 30° C. or less, thoroughly washed, and "formed" into the desired shape, e. g., into rods, tubes, "macaroni" or tablets, for example by stamping or extruding. The formed catalyst mass may then be thoroughly dried, preferably at ordinary temperatures. The final reduction of the nickel oxide to nickel is also advantageously carried out at relatively low temperatures.

For example, to prepare a very active catalyst, a cold aqueous solution of about 4 parts of nickel nitrate to 1 part of aluminium nitrate may be added to a cold solution of sodium carbonate to produce a gelatinous or colloidal type of precipitate. The precipitate may then be pressed, drained or centrifuged and washed free from sodium nitrate with cold water, after which it may be compressed and extruded in the form of rods or otherwise shaped. The remainder of the water may then be removed, for instance by evaporation at a temperature below about 30° C. The dry "formed" catalyst may then be reduced, for example by heating it in carbon monoxide or hydrogen to a temperature of the order of 250° C.

Although it is preferable to carry out the preparation of the catalyst at low temperatures, higher temperatures may be employed if desired. However the catalyst, while still being highly active, will then be obtained in a more or less powdery form which is much less useful than is the formed catalyst prepared at low temperatures.

The starting materials for the reaction may consist of a mixture of substantially pure carbon monoxide and hydrogen. If desired however the mixture may contain other gases such as nitrogen, carbon dioxide, and even methane itself. Thus for example a blue water gas may be used, as may ordinary coal gas to which further quantities of carbon monoxide have been added, or other industrial gases containing hydrogen and carbon monoxide may be employed. The gas mixture may contain approximately equal proportions of carbon monoxide and hydrogen, but better results and a longer catalyst life may usually be attained by employing excess of hydrogen, for example 2, 3, 4 or even more volumes of hydrogen for each volume of carbon monoxide.

While the "formed" nickel-alumina catalyst shows a remarkable resistance to sulphur poisoning, it is advisable to remove sulphur from the reaction gases so far as is conveniently possible. For instance, the gas (e. g., coal gas with added carbon monoxide) may be admixed with steam and passed over a suitable catalyst at a high temperature. The treated gases may then be washed with an alkali such as sodium hydroxide to remove the hydrogen sulphide formed in the purification reaction; the alkali wash also has the advantage of removing carbon dioxide if this gas is present.

To effect the conversion of the carbon monoxide and hydrogen into methane, the gas mixture may be passed over the nickel-alumina catalyst at an elevated temperature and preferably under atmospheric pressure, or a pressure not greatly in excess of atmospheric. For example, the gases may be heated in the presence of the catalyst to a temperature above about 250° C., for example between 250° C. and 700° C. Preferably temperatures between about 300° and 450° or 500° C. are employed, temperatures of the order of 330° to 380° or 400° being particularly useful.

The gases issuing from the catalyst zone may contain up to 70% or more of methane; the other most important constituents are unchanged carbon monoxide and hydrogen, and carbon dioxide. If desired the latter gas may be removed from the mixture by intensive cooling or washing or in any other suitable way; other impurities may also be removed if desired, either with or separately from the carbon dioxide. For many purposes, however, for example for the conversion of the methane by heat treatment into ethylene, acetylene, or other hydrocarbons, the gas mixture may be used without purification.

As compared with nickel-alumina catalysts deposited on carriers, the "formed" nickel-alumina catalysts possess a high activity coupled with a remarkably long life and resistance to poisoning. For example, a catalyst of this kind may be employed continuously for a period of days without substantial loss of activity under conditions which put a nickel on pumice catalyst out of action in a few hours.

If desired the alumina of the catalyst may be wholly or partly replaced by a dehydrating or dehydrogenating catalyst, especially an oxide dehydrating or dehydrogenating catalyst. Thus, for example, the catalyst may comprise magnesia, thoria, the so-called blue oxide of tungsten or titania.

The following examples illustrate the invention without in any way limiting it.

*Example 1*

A cold aqueous solution containing 4 parts of nickel nitrate to 1 part of aluminium nitrate is added to cold sodium carbonate solution. The precipitate formed is first washed with cold water until it is substantially free from sodium nitrate, and is then drained and pressed, and extruded through a die in the form of rods. The "formed" mass is then kept at a temperature below 30° C. until it is practically dry, after which it is heated to 250° C. in a current of hydrogen or of a mixture containing hydrogen and carbon monoxide until the nickel oxide which it contains is reduced to the metal.

A mixture of 3 parts by volume of hydrogen with 1 part of carbon monoxide is passed over the catalyst so prepared at a temperature of about 350° C. and under atmospheric pressure. The gases issuing from the catalyst zone contain a good proportion of methane and only a small amount of carbon monoxide.

*Example 2*

A mixture of carbon monoxide and coal gas is treated so as to remove much of the sulphur from the coal gas. The resulting gas, consisting mainly of carbon monoxide, hydrogen and methane in the approximate proportions 1:2:1, and still containing about 45 mg./litre of sulphur, is passed over the catalyst described in Example 1 at about 350° C.; the resulting gas contains over 50% of methane. The catalyst retains its activity even after many hours.

Having described our invention, what we desire to secure by Letters Patent is:

1. Process for preparing a shaped catalyst mass for use in the synthesis of methane from carbon monoxide and hydrogen, which comprises precipitating together nickel hydroxide and aluminum hydroxide from aqueous solutions of salts of said metal, washing the precipitate, forming the precipitate into a shaped mass and drying the shaped mass, all these operations being carried out at a temperature below 30° C., and subsequently reducing the nickel hydroxide at a temperature of the order of 250° C.

2. Process for preparing a shaped catalyst mass for use in the synthesis of methane from carbon monoxide and hydrogen, which comprises precipitating nickel hydroxide and aluminum hydroxide from an aqueous solution of their nitrates containing 4 parts of nickel nitrate to each part of aluminum nitrate, washing the precipitate, forming the precipitate into a shaped mass and drying the shaped mass, all of these operations being carried out at a temperature below 30° C. and subsequently reducing the nickel hydroxide at a temperature of the order of 250° C.

3. A formed catalyst mass, which retains its shape under reaction conditions and is highly active towards the reaction of carbon monoxide and hydrogen to produce methane, said catalyst mass comprising nickel and alumina and which is formed by co-precipitating the hydroxides of these metals from aqueous solutions of salts thereof, washing, forming and drying the precipitate, all of these operations being carried out at a temperature below 30° C., and subsequently reducing the nickel hydroxide at a temperature of the order of 250° C.

4. A formed catalyst mass, which retains its shape under reaction conditions and is highly active towards the reaction of carbon monoxide and hydrogen to produce methane, said catalyst mass comprising nickel and alumina and which is formed by co-precipitating the hydroxides of these metals from aqueous solutions of their nitrates containing four parts of nickel nitrate to each part of alumina nitrate, washing, forming and drying the precipitate, all of these operations being carried out at a temperature below 30° C., and subsequently reducing the nickel hydroxide at a temperature of the order of 250° C.

RONALD PAGE.
EDWARD BOADEN THOMAS.